United States Patent
Tabarovsky et al.

(10) Patent No.: US 6,574,562 B2
(45) Date of Patent: Jun. 3, 2003

(54) DETERMINATION OF FORMATION ANISOTROPY USING MULTI-FREQUENCY PROCESSING OF INDUCTION MEASUREMENTS WITH TRANSVERSE INDUCTION COILS

(75) Inventors: Leonty A. Tabarovsky, Houston, TX (US); Michael B. Rabinovich, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/825,104

(22) Filed: Apr. 3, 2001

(65) Prior Publication Data
US 2002/0173913 A1 Nov. 21, 2002

(51) Int. Cl.⁷ .................................................. G01V 1/40
(52) U.S. Cl. .............................................. 702/7; 702/6
(58) Field of Search .................................. 702/7, 6, 9

(56) References Cited

U.S. PATENT DOCUMENTS

| | | | |
|---|---|---|---|
| 5,329,448 A | 7/1994 | Rosthal | 364/422 |
| 5,656,930 A | 8/1997 | Hagiwara | 324/339 |
| 5,666,057 A | 9/1997 | Beard et al. | 324/339 |
| 5,703,773 A | 12/1997 | Tabarovsky et al. | 364/422 |
| 5,781,436 A | 7/1998 | Forgang et al. | 364/422 |
| 5,854,991 A * | 12/1998 | Gupta et al. | 702/7 |
| 5,884,227 A | 3/1999 | Rabinovich et al. | 702/7 |
| 5,999,883 A | 12/1999 | Gupta et al. | 702/7 |

OTHER PUBLICATIONS

J. H. Moran et al.; *Effects of formation anisotropy on resistivity–logging measurements*, Geophysics, vol. 44, No. 7, pp. 1266–1286, 21 Figs., 4 Tables.

\* cited by examiner

*Primary Examiner*—Edward Lefkowitz
*Assistant Examiner*—Anthony Gutierrez
(74) *Attorney, Agent, or Firm*—Madan, Mossman & Sriram, P.C.

(57) ABSTRACT

Skin-effect corrections are applied to measurements made by a transverse induction logging tool to give corrected measurements indicative of vertical conductivities of a formation. Data from a conventional induction logging tool are inverted or focused to give an isotropic model of formation resistivity. A forward modeling is used to derive from the isotropic model measurements that would be expected with a transverse induction logging tool. Skin-effect corrections are applied to these expected measurements. The formation anisotropy is determined from the skin-effect corrected transverse induction measurements, the skin-effect corrected expected measurements and from the isotropic model conductivities.

28 Claims, 4 Drawing Sheets

DETERMINATION OF FORMATION ANISOTROPY USING MULTI-FREQUENCY PROCESSING OF INDUCTION MEASUREMENTS WITH TRANSVERSE INDUCTION COILS

BACKGROUND OF THE INVENTION

1. Field of the Invention

The invention is related generally to the field of interpretation of measurements made by well logging instruments for the purpose of determining the properties of earth formations. More specifically, the invention is related to a method for determination of anisotropic formation resistivity using multifrequency, multicomponent resistivity data.

2. Background of the Art

Electromagnetic induction and wave propagation logging tools are commonly used for determination of electrical properties of formations surrounding a borehole. These logging tools give measurements of apparent resistivity (or conductivity) of the formation that when properly interpreted are diagnostic of the petrophysical properties of the formation and the fluids therein.

The physical principles of electromagnetic induction resistivity well logging are described, for example, in, H. G. Doll, Introduction to Induction Logging and Application to Logging of Wells Drilled with Oil Based Mud, Journal of Petroleum Technology, vol. 1, p.148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517; U.S. Pat. No. 5,157,605 issued to Chandler et al, and U.S. Pat. No. 5,452,761 issued to Beard et al.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art.

The effect of formation anisotropy on resistivity logging measurements have long been recognized. Kunz and Moran studied the anisotropic effect on the response of a conventional logging device in a borehole perpendicular to the bedding plane of t thick anisotropic bed. Moran and Gianzero extended this work to accommodate an arbitrary orientation of the borehole to the bedding planes.

Rosthal (U.S. Pat. No. 5,329,448) discloses a method for determining the horizontal and vertical conductivities from a propagation or induction well logging device. The method assumes that θ, the angle between the borehole axis and the normal to the bedding plane, is known. Conductivity estimates are obtained by two methods. The first method measures the attenuation of the amplitude of the received signal between two receivers and derives a first estimate of conductivity from this attenuation. The second method measures the phase difference between the received signals at two receivers and derives a second estimate of conductivity from this phase shift. Two estimates are used to give the starting estimate of a conductivity model and based on this model, an attenuation and a phase shift for the two receivers are calculated. An iterative scheme is then used to update the initial conductivity model until a good match is obtained between the model output and the actual measured attenuation and phase shift.

Hagiwara shows that the log response of an induction-type logging tool can be described by an equation of the form $$V \propto \frac{i}{L^3}(-2e^{ikL}(1-ikL) + ikl(e^{ik\beta} - e^{ikL})) \quad (1)$$

where $$\beta^2 = \cos^2\theta + \sin^2\theta \quad (2)$$

and $$k^2 = \omega^2 \mu(\in_h + i\sigma_h/\omega) \quad (3)$$

where, L is the spacing between the transmitter and receiver, k is the wavenumber of the electromagnetic wave, $\mu$ is the magnetic permeability of the medium, θ is the deviation of the borehole angle from the normal to the formation, λ is the anisotropy factor for the formation, ω is the angular frequency of the electromagnetic wave, $\sigma_h$ is the horizontal conductivity of the medium and $\in_h$ is the horizontal dielectric constant of the medium.

Eq. (3) is actually a pair of equations, one corresponding to the real part and one corresponding to the imaginary part of the measured signal, and has two unknowns. By making two measurements of the measured signal, the parameters k and β can be determined. The two needed measurements can be obtained from (1) R and X signals from induction logs, (2) phase and attenuation measurements from induction tools, (3) phase or attenuation measurements from induction tools with two different spacings, or (4) resistivity measurements at two different frequencies. In the low frequency limit, $\in$ can be neglected in Eq. (3) and from known values of ω and $\mu$, the conductivity σ can be determined from k, assuming a value of $\mu$ equal to the permittivity of free space Wu (U.S. Pat. No. 6,092,024) recognized that the solution to eqs. (1)–(3) may be nonunique and showed how this ambiguity in the solution may be resolved using a plurality of measurements obtained from multiple, spacings and/or multiple frequencies.

One solution to the limitation of the induction instruments known in the art is to include a transverse transmitter coil and a transverse receiver coil on the induction instrument, whereby the magnetic moments of these transverse coils is substantially perpendicular to the axis of the instrument. Such as solution was suggested in Tabarovsky and Epov, "Geometric and Frequency Focusing in Exploration of Anisotropic Seams", Nauka, USSR Academy of Science, Siberian Division, Novosibirsk, pp. 67–129 (1972). Tabarovsky and Epov suggest various arrangements of transverse transmitter coils and transverse receiver coils, and present simulations of the responses of these transverse coil systems configured as shown therein. Tabarovsky and Epov also describe a method of substantially reducing the effect on the voltage induced in transverse receiver coils which would be caused by eddy currents flowing in the wellbore and invaded zone. The wellbore is typically filled with a conductive fluid known as drilling mud. Eddy currents which flow in the drilling mud can substantially affect the magnitude of voltages induced in the transverse receiver coils. The wellbore signal reduction method described by Tabarovsky and Epov can be described as "frequency focusing", whereby induction voltage measurements are made at more than one frequency, and the signals induced in the transverse receiver coils are combined in a manner so that the effects of eddy currents flowing within certain geometries, such as the wellbore and invasion zone, can be substantially eliminated from the final result. Tabarovsky and Epov, however, do not suggest any configuration of signal processing circuitry which could perform the frequency focusing method suggested in their paper.

Strack et al. (U.S. Pat. No. 6,147,496) describe a multi-component logging tool comprising a pair of 3-component transmitters and a pair of 3-component receivers. Using measurements made at two different frequencies, a combined signal is generated having a reduced dependency on the electrical conductivity in the wellbore region. U.S. Pat. No. 5,781,436 to Forgang et al, the contents of which are fully incorporated herein by reference, discloses a suitable hardware configuration for multifrequency, multicomponent induction logging.

U.S. Pat. No. 5,999,883 issued to Gupta et al, (the "Gupta patent"), the contents of which are fully incorporated here by reference, discloses a method for determination of an initial estimate of the horizontal and vertical conductivity of anisotropic earth formations. Electromagnetic induction signals induced by induction transmitters oriented along three mutually orthogonal axes are measured at a single frequency. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to a one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter. One drawback in the teachings of Gupta et al is that the step of determination of the relative angle of inclination of the required measurements of three components of data with substantially identical transmitter-receiver spacings. Because of limitations on the physical size of the tools, this condition is difficult to obtain; consequently the estimates of resistivities are susceptible to error. In addition, due to the highly nonlinear character of the response of multicomponent tools, such inversion methods are time consuming at a single frequency and even more so at multiple frequencies.

Analysis of the prior art leads to the conclusion that known methods of determining anisotropic resistivities in real time require very low frequencies; as a consequence of the low frequencies, the signal-to-noise ratio in prior art methods is quite low.

There is a need for a fast and robust method of determination of anisotropic resistivity. Such a method should preferably be able to use high frequency measurements that are known to have better signal-to-noise ratio than low frequency methods. The present invention satisfies this need.

SUMMARY OF THE INVENTION

The present invention is a method of determination of horizontal and vertical conductivities of subsurface formations using a combination of data acquired with a transverse induction logging tool such as the 3DEX™ tool and data acquired with a conventional high definition induction logging tool (HDIL). 3DEX™ data are acquired at a plurality of frequencies and a multifrequency skin-effect correction is applied to the 3DEX™ data. An isotropic resistivity model is derived from HDIL data (multiple frequency and multiple spacing). This may be done either by inversion or by focusing. Using a forward modeling program, expected values of the transverse components of the 3DEX™ data for an isotropic model are derived. A skin-effect correction is applied to the model output. Differences between the focused model output and the focused acquired data are indicative of anisotropy and this difference is used to derive an anisotropy factor.

In a preferred embodiment of the invention, a Taylor series expansion is used to approximate the TILT data and use is made of the fact that the coefficient of the $\omega^{3/2}$ is relatively insensitive to borehole and invasion effects.

DETAILED DESCRIPTION OF THE INVENTION

Figure 1:
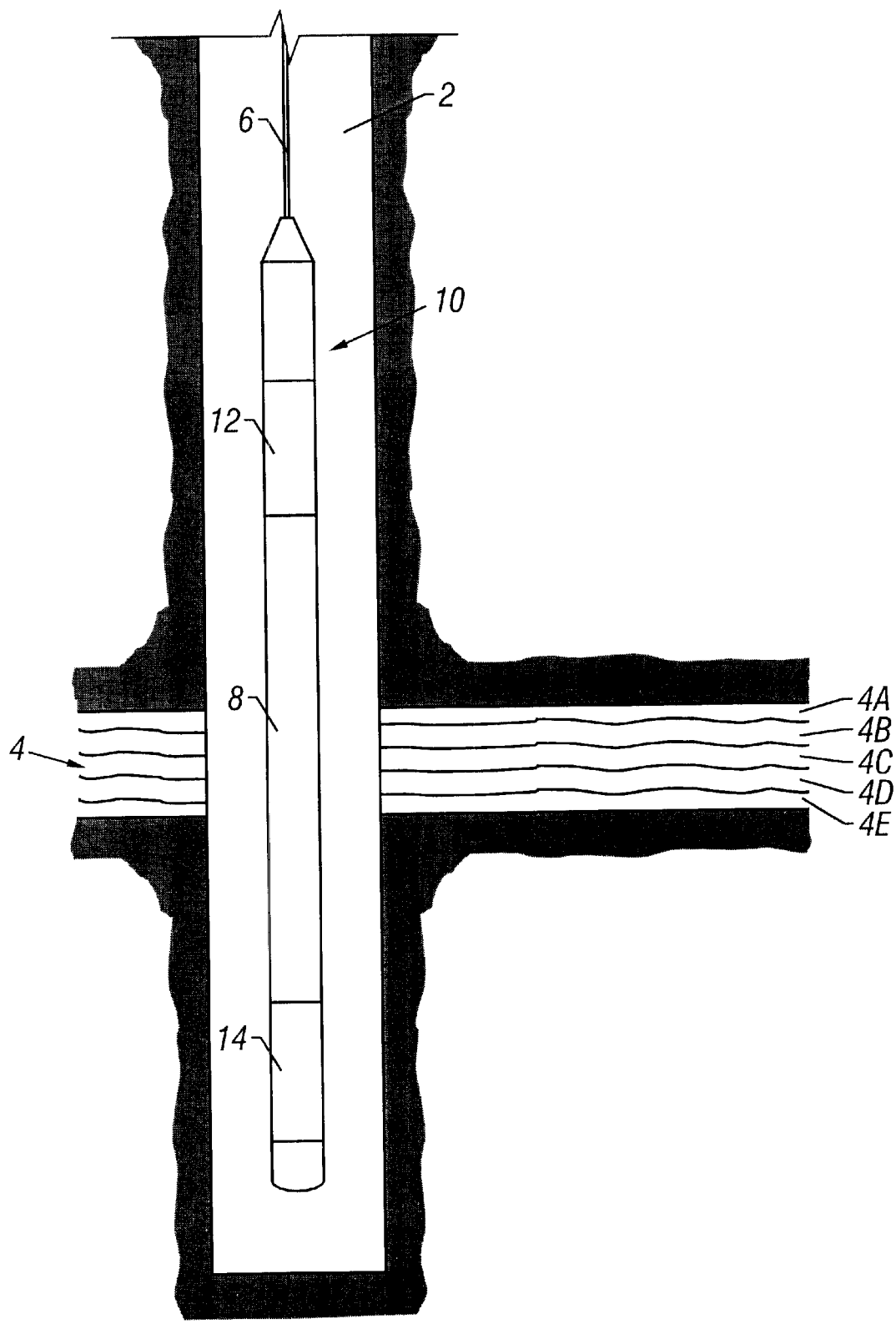
FIG. 1 shows an induction instrument disposed in a wellbore penetrating earth formations.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit attached to the auxiliary electronics unit 14; and a receiver/signal processing/ telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
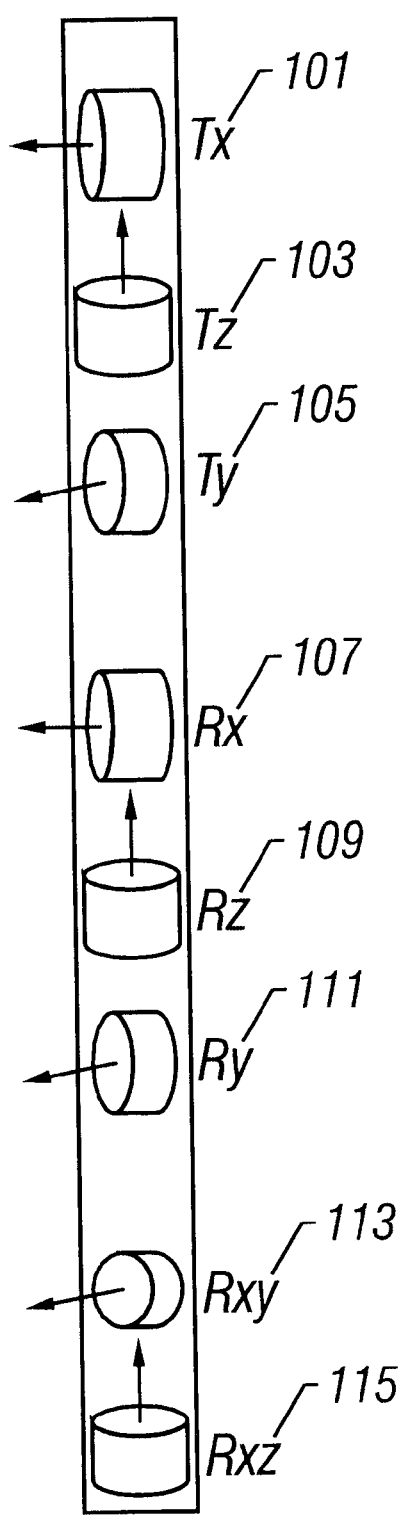
FIG. 2 shows the arrangement of transmitter and receiver coils in a preferred embodiment of the present invention marketed under the name 3DExplorer™

Turning now to FIG. 2, the configuration of transmitter and receiver coils in a preferred embodiment of the 3DExplorer™ induction logging instrument of Baker Hughes is disclosed. Such a logging instrument is an example of a transverse induction logging tool. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields $H_{xx}$, $H_{zz}$, and $H_{yy}$. In addition, the receivers 113 and 115 measure two cross-components $H_{xy}$, and $H_{xz}$ of the magnetic field produced by the x-component transmitter.

Figure 3:
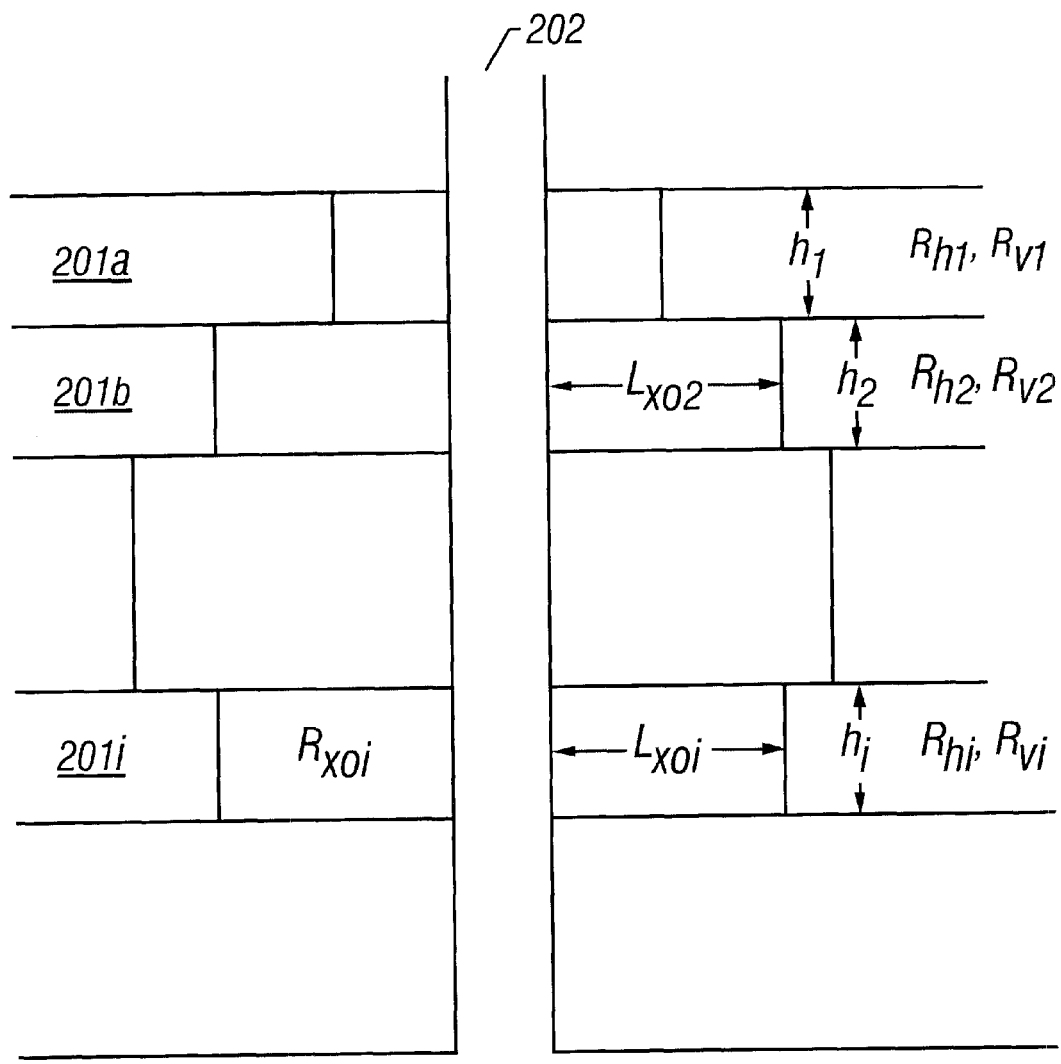
FIG. 3 shows the model used in the present invention.

FIG. 3 is a schematic illustration of the model used in the present invention. The subsurface of the earth is characterized by a plurality of layers 201a, 201b, . . . 201i. The layers have thicknesses denoted by $h_1$, $h_2$, . . . $h_i$. The horizontal and vertical resistivities in the layers are denoted by $R_{h1}$, $R_{h2}$, . . . $R_{hi}$ and $R_{v1}$, $R_{v2}$, . . . $R_{vi}$, respectively. Equivalently, the model may be defined in terms of conductivities (reciprocal of resistivity). The borehole is indicated by 202 and associated with each of the layers are invaded zones in the vicinity of the borehole wherein borehole fluid has invaded the formation and altered is properties so that the electrical properties are not the same as in the uninvaded portion of the formation. The invaded zones have lengths $L_{x01}$, $L_{x02}$, . . . $L_{x0i}$ extending away from the borehole. The resistivities in the invaded zones are altered to values $R_{x01}$, $R_{x02}$, . . . $R_{x0i}$. In the embodiment of the invention discussed here, the invaded zones are assumed to be isotropic while an alternate embodiment of the invention includes invaded zones that are anisotropic, i.e., they have different horizontal and vertical resistivities. It should further be noted that the discussion of the invention herein may be made in terms of resistivities or conductivities (the reciprocal of resistivity).

Figure 4:
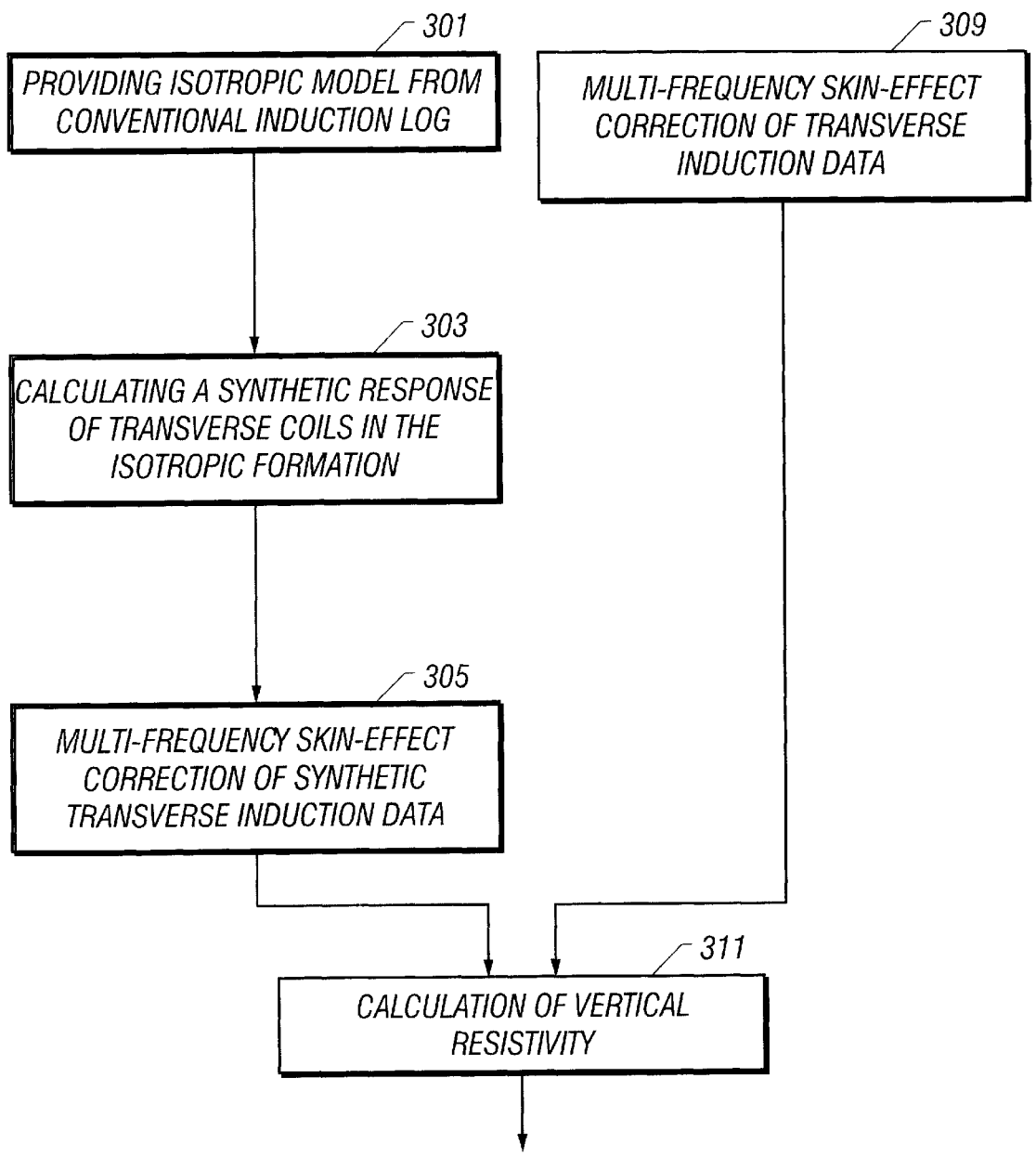
FIG. 4 is a flow chart illustrating steps comprising the present invention.

Turning now to FIG. 4, a flow chart of the method of the present invention is shown. Multifrequency, multicomponent induction data are obtained using, for example, the 3DEX™ tool, and a multifrequency skin-effect correction is applied to these data 309. As disclosed in U.S. Pat. No. 5,703,773 to Tabarovsky et al., the contents of which are fully incorporated herein by reference, the response at multiple frequencies may be approximated by a Taylor series expansion of the form:

$$\begin{bmatrix} \sigma_a(\omega_1) \\ \sigma_a(\omega_2) \\ \vdots \\ \sigma_a(\omega_{m-1}) \\ \sigma_a(\omega_m) \end{bmatrix} = \begin{bmatrix} 1 & \omega_1^{1/2} & \omega_1^{3/2} & \cdots & \omega_1^{n/2} \\ 1 & \omega_2^{1/2} & \omega_2^{3/2} & \cdots & \omega_2^{n/1} \\ \vdots & \vdots & \vdots & \ddots & \vdots \\ 1 & \omega_{m-1}^{1/2} & \omega_{m-1}^{3/2} & \cdots & \omega_{m-1}^{n/2} \\ 1 & \omega_m^{1/2} & \omega_m^{3/2} & \cdots & \omega_m^{n/2} \end{bmatrix} \begin{bmatrix} s_0 \\ s_{1/2} \\ \vdots \\ s_{(n-1)/2} \\ s_{n/2} \end{bmatrix} \quad (4)$$

In a preferred embodiment of the invention, the number m of frequencies ω is ten. In eq.(4), n is the number of terms in the Taylor series expansion. This can be any number less than or equal to m. The coefficient $s_{3/2}$ of the $\omega^{3/2}$ term (ω being the square of k, the wave number) is generated by the primary field and is relatively unaffected by any inhomogeneities in the medium surround the logging instrument, i.e., it is responsive primarily to the formation parameters and not to the borehole and invasion zone. In a preferred embodiment of the invention, this is used as an estimate of the skin-effect corrected transverse induction data. Specifically, these are applied to the $H_{xx}$, and $H_{yy}$ components. Those versed in the art would recognize that in a vertical borehole, the $H_{xx}$, and $H_{yy}$ would be the same, with both being indicative of the vertical conductivity of the formation. In one embodiment of the invention, the sum of the $H_{xx}$ and $H_{yy}$ is used so as to improve the signal to noise ratio (SNR).

Other methods of skin effect correction may also be used in the present invention. An example is that disclosed in U.S. Pat. No. 5,666,057 to Beard et al., the contents of which are fully incorporated herein by reference. Beard teaches the use of a polynomial curve fitting to the multifrequency data; constraints on the slope of the derived polynomial are used to obtain a skin-effect corrected signal.

Along with the 3DEX™, the present method also uses data from a prior art High Definition Induction Logging (HDIL) tool having transmitter and receiver coils aligned along the axis of the tool. These data are inverted using a method such as that taught by Tabarovsky et al, or by U.S. Pat. No. 5,884,227 to Rabinovich et al., the contents of which are fully incorporated herein by reference, to give an isotropic model of the subsurface formation 301. Instead of, or in addition to the inversion methods, a focusing method may also be used to derive the initial model. Such focusing methods would be known to those versed in the art and are not discussed further here. As discussed above, the HDIL tool is responsive primarily to the horizontal conductivity of the earth formations when run in a borehole that is substantially orthogonal to the bedding planes. The inversion method taught by Tabarovsky et al and by Rabinovich et al are computationally fast and may be implemented in real time. This inversion give an isotropic model of the horizontal conductivities (or resistivities) in FIG. 3.

Using the isotropic model derived at 301, a forward modeling is used to calculate a synthetic response of the 3DEX™ tool 303 at a plurality of frequencies. A suitable forward modeling program for the purpose is disclosed in Tabarovsky and Epov "Alternating Electromagnetic Field in an Anisotropic Layered Medium" *Geol. Geoph.*, No. 1, pp. 101–109. (1977). Skin-effect corrections are then applied to these synthetic data 305. In a preferred embodiment of the invention, the method taught by Tabarovsky is used for the purpose. Alternatively, and by way of example, the method taught by by Beard et al. may be used.

In the absence of anisotropy, the output from 305 should be identical to the output from 309. Denoting by $\sigma_{iso}$ the skin-effect corrected transverse component synthetic data from 305 and by $\sigma_{meas}$ the skin-effect corrected field data from 309, the anisotropy factor $\lambda$ is then calculated based on the following derivation:

The $H_{xx}$ for an anisotropic medium is given by $$H_{xx} = -\frac{M}{4L^3}\left[-\left(\frac{L}{\delta_v}\right)^2 + \left(\frac{1}{3} + \frac{1}{\lambda}\right)\left(\frac{L}{\delta_h}\right)^3\right] \quad (5)$$

where $$\delta_v = \sqrt{\frac{2}{\omega\mu\sigma_v}}, \; \delta_h = \sqrt{\frac{2}{\omega\mu\sigma_h}}, \; \lambda = \frac{\sigma_h}{\sigma_v}.$$

For a three-coil subarray, $$H_{xx} = -\frac{1}{4\pi}\left(\frac{1}{3} + \frac{1}{\lambda}\right)\left(\frac{\omega\mu\sigma_h}{2}\right)^{3/2} \sum M_i \quad (6)$$

Upon introducing the apparent conductivity for $H_{xx}$ this gives $$\sigma_{meas}^{3/2} = \frac{3}{4}\left(\frac{1}{3} + \frac{1}{\lambda}\right)\sigma_h^{3/2}$$

or $$(\sigma_{meas}^{3/2} - \sigma_{iso}^{3/2}) = \sigma_h^{3/2}\left(\frac{1}{4} + \frac{3}{4\lambda} - 1\right) = \sigma_h^{3/2}\left(\frac{3}{4\lambda} - \frac{3}{4}\right)$$

which gives the result $$\lambda = \frac{1}{1 - \frac{4}{3}\left(\frac{\sigma_{iso}^{3/2} - \sigma_{meas}^{3/2}}{\sigma_t^{3/2}}\right)} \quad (7)$$

where $\sigma_t$ is the conductivity obtained from the HDIL data, i.e., the horizontal conductivity. The vertical conductivity is obtained by dividing $\sigma_t$ by the anisotropy factor from eq. (5).

The present invention has been discussed above with respect to measurements made by a transverse induction logging tool conveyed on a wireline. This is not intended to be a limitation and the method is equally applicable to measurements made using a comparable tool conveyed on a measurement-while-drilling (MWD) assembly or on coiled tubing.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of logging of subsurface formations including at least one layer having a horizontal conductivity and a vertical conductivity, the method comprising:
   (a) conveying an electromagnetic logging tool into a borehole in the subsurface formations;
   (b) using said electromagnetic logging tool for obtaining, at each of a plurality of frequencies, at least one measurement indicative of said vertical conductivity;
   (c) applying a skin-effect correction to said at least one measurement at said plurality of frequencies and obtaining a skin-effect corrected conductivity measurement associated with said at least one layer;
   (d) obtaining a substantially isotropic model including, for said at least one layer, a layer thickness and a horizontal conductivity;
   (e) determining an expected value of said at least one skin-effect corrected conductivity measurement from said model;
   (f) determining from said skin effect corrected measurement, said expected value of the skin-effect corrected measurement, and said horizontal conductivity, a vertical conductivity of the at least one layer.

2. The method of claim 1 wherein said plurality of frequencies is less than ten.

3. The method of claim 1 wherein said at least one measurement is selected from the group consisting of (i) a $H_{xx}$ component, (ii) a $H_{yy}$ component, and, (iii) a sum of a $H_{xx}$ and a $H_{yy}$ component.

4. The method of claim 1 wherein applying said skin-effect correction further comprises using a Taylor series expansion.

5. The method of claim 4 wherein said Taylor series expansion is in half-integer powers of frequency.

6. The method of claim 5 wherein said skin-effect corrected conductivity measurements is related to the coefficient of the three-half power of frequency in the Taylor series expansion.

7. The method of claim 1 wherein obtaining said model further comprises making measurements of a $H_{zz}$ component at a plurality of frequencies and inverting said $H_{zz}$ components.

8. The method of claim 1 wherein obtaining said model further comprises:
   (A) making measurements of a $H_{zz}$ component at a plurality of spacings of a transmitter and a receiver on an electromagnetic logging tool; and
   (B) at least one of: (i) inverting of said $H_{zz}$ components and, (iii) focusing of said $H_{zz}$ components.

9. The method of claim 1 wherein determining said expected value of said at least one skin-effect corrected conductivity further comprises:
   (i) setting a vertical conductivity equal to a horizontal conductivity; and
   (ii) using a forward modeling program to obtain at least one of: (A) an expected $H_{xx}$ component, and, (B) an expected $H_{yy}$ component;
wherein said expected components are obtained at a plurality of frequencies.

10. The method of claim 9 wherein determining said expected value of said at least one skin-effect corrected conductivity further comprises applying a skin-effect correction to said expected components.

11. The method of claim 10 wherein determining a vertical conductivity of the at least one layer further comprises using a relationship of the form $$\lambda = \frac{1}{1 - \frac{4}{3}\left(\frac{\sigma_{iso}^{3/2} - \sigma_{meas}^{3/2}}{\sigma_t^{3/2}}\right)}$$

wherein $\lambda$ is an anisotropy ratio, $\sigma_{iso}$ is said expected value of said at least one skin-effect corrected conductivity measurement from said model, $\sigma_{meas}$ is said skin-effect corrected conductivity measurement, and $\sigma_t$ is said horizontal conductivity.

12. A method of determining a parameter of interest of subsurface formations including a plurality of layers each having a horizontal resistivity and a vertical resistivity, the method comprising:

(a) using sensors on an electromagnetic logging tool conveyed in a borehole in the subsurface formations and making measurements indicative of said horizontal conductivities;

(b) deriving from said measurements indicative of horizontal conductivities an isotropic model of said subsurface formations;

(c) using sensors on an electromagnetic logging tool conveyed in a borehole in the subsurface formations and making measurements indicative of said vertical conductivities;

(d) applying a skin-effect correction to said measurements in (c) at said plurality of frequencies and obtaining a skin-effect corrected conductivity measurement;

(e) using a modeling program and determining from said isotropic model expected measurements corresponding to said skin-effect corrected conductivity measurements and applying skin-effect corrections to said expected measurements;

(f) determining from said skin-effect corrected measurements, corresponding skin-effect corrected expected measurements, and said isotropic model, said parameter of interest.

13. The method of claim 12 wherein said parameter of interest is a vertical conductivity of one of said plurality of layers.

14. The method of claim 12 wherein using said sensors further comprises making measurements at a plurality of frequencies.

15. The method of claim 14 wherein said plurality of frequencies is less than eight.

16. The method of claim 12 wherein said measurements indicative of vertical conductivities comprise at least one of: (i) a $H_{xx}$ component, (ii) a $H_{yy}$ component, and, (iii) a sum of the $H_{xx}$ and $H_{yy}$ components.

17. The method of claim 12 wherein applying said skin-effect correction further comprises using a Taylor series expansion of said at least one component.

18. The method of claim 17 wherein said Taylor series expansion is in half-integer powers of frequency.

19. The method of claim 18 wherein said skin-effect corrected conductivity measurements is related to the coefficient of the three-half power of frequency in the Taylor series expansion.

20. The method of claim 12 wherein deriving said isotropic model further comprises at least one of: (i) inversion of a $H_{zz}$ component at a plurality of frequencies, (ii) inversion of a $H_{zz}$ component acquired with a plurality of spacings of a transmitter and a receiver on the logging tool of (a), and, (iii) focusing of a $H_{zz}$ acquired with a plurality of spacings of a transmitter and receiver on the logging tool of (a).

21. The method of claim 12 further comprising determining said expected measurements at a plurality of frequencies, and wherein applying skin effect corrections to said expected measurements further comprises using a Taylor series expansion in half integer powers of frequency.

22. The method of claim 12 wherein determining the parameter of interest further comprises using a relationship of the form $$\lambda = \frac{1}{1 - \frac{4}{3}\left(\frac{\sigma_{iso}^{3/2} - \sigma_{meas}^{3/2}}{\sigma_t^{3/2}}\right)}$$

wherein $\lambda$ is an anisotropy ratio, $\sigma_{iso}$ is said expected value of said at least one skin-effect corrected conductivity measurement from said model, $\sigma_{meas}$ is said skin-effect corrected conductivity measurement, and $\sigma_t$ is a resistivity in said isotropic model.

23. A method of logging of subsurface formations including at least one layer having a horizontal conductivity and a vertical conductivity, the method comprising:

(a) conveying an electromagnetic logging tool into a borehole in the subsurface formations;

(b) using said electromagnetic logging tool for obtaining at at least one frequency, at least one measurement indicative of said vertical conductivity;

(c) obtaining a substantially isotropic model including, for said at least one layer, a layer thickness and a horizontal conductivity;

(d) determining from said model an expected value of said at least one measurement;

(e) determining from said measurement, said expected value of the measurement, and said horizontal conductivity, a vertical conductivity of the at least one layer.

24. The method of claim 23 wherein said at least one measurement is selected from the group consisting of (i) a $H_{xx}$ component, (ii) a $H_{yy}$ component, and, (iii) a sum of a $H_{xx}$ and a $H_{yy}$ component.

25. The method of claim 23 wherein obtaining said model further comprises making measurements of a $H_{zz}$ component at a plurality of frequencies and inverting said $H_{zz}$ components.

26. The method of claim 23 wherein obtaining said model further comprises:

(A) making measurements of a $H_{zz}$ component at a plurality of spacings of a transmitter and a receiver on an electromagnetic logging tool; and (B) at least one of: (i) inverting of said $H_{zz}$ components, and, (iii) focusing of said $H_{zz}$ components.

27. The method of claim 23 wherein determining a vertical conductivity of the at least one layer further comprises using a relationship of the form $$\lambda = \frac{1}{1 - \frac{4}{3}\left(\frac{\sigma_{iso}^{3/2} - \sigma_{meas}^{3/2}}{\sigma_t^{3/2}}\right)}$$

wherein $\lambda$ is an anisotropy ratio, $\sigma_{iso}$ is said expected value of said conductivity measurement from said model, $\sigma_{meas}$ is said conductivity measurement, and $\sigma_t$ is said horizontal conductivity.

28. A method of logging of subsurface formations including at least one layer having a horizontal conductivity and a vertical conductivity, the method comprising:

(a) conveying an electromagnetic logging tool into a borehole in the subsurface formations;

(b) using said electromagnetic logging tool for obtaining at at least one frequency, a plurality of measurements with different source-receiver spacings, said plurality of measurements indicative of said vertical conductivity;

(c) correcting said plurality of measurements to provide a corrected measurement indicative of a zero-frequency value, (d) obtaining a substantially isotropic model including, for said at least one layer, a layer thickness and a horizontal conductivity;

(e) determining from said model an expected value of said corrected measurement;

(f) determining from said corrected measurement, said expected value of the measurement, and said horizontal conductivity, the vertical conductivity of the at least one layer.

* * * * *